3,221,070
ISOLATION OF TETRAFLUOROETHYLENE AND HEXAFLUOROPROPENE FROM THE PYROLYZATES OF CHLORODIFLUOROMETHANE

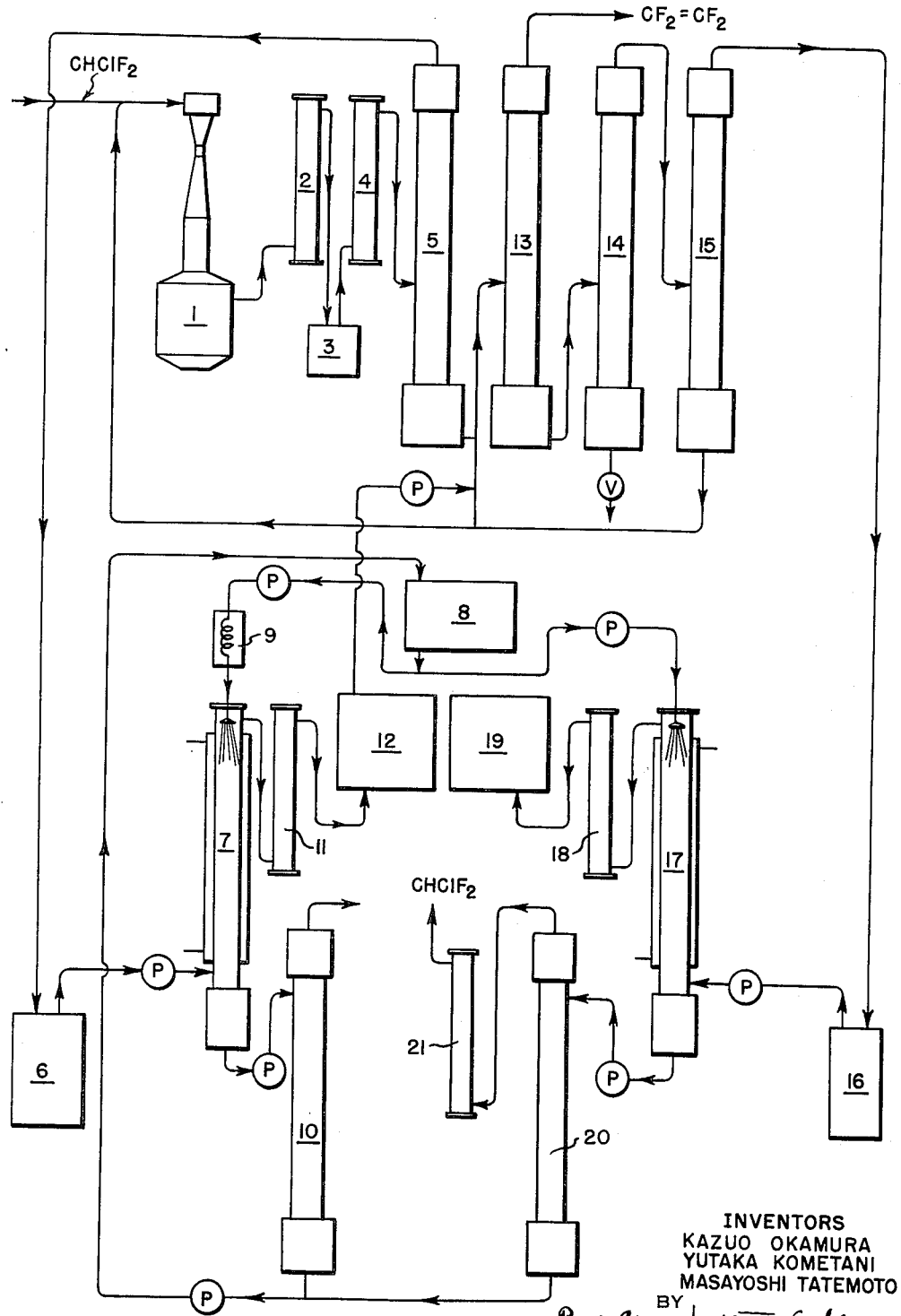

Kazuo Okamura, Suita-shi, Osaka, Yutaka Kometani, Sanda-shi, Hyogo Prefecture, and Masayoshi Tatemoto, Osaka, Japan, assignors, by mesne assignments, to Thiokol Chemical Corporation, Trenton, N.J., a corporation of Delaware
Filed Sept. 12, 1963, Ser. No. 308,496
11 Claims. (Cl. 260—653.3)

This invention relates to the separation and recovery of the two commercially important fluoroolefins which are formed upon the pyrolysis of chlorodifluoromethane, and its principal object is to provide a process for the isolation and recovery of substantially pure tetrafluoroethylene and hexafluoropropene from chlorodifluoromethane pyrolyzates.

Tetrafluoroethylene and hexafluoropropene are produced commercially by the pyrolytic decomposition of chlorodifluoromethane at a temperature from about 600° C. to about 1000° C., which pyrolysis is believed to result in the formation of the difluoromethylene diradical, which, in turn, is capable of undergoing dimerization to tetrafluoroethylene and of undergoing more complex reactions to form hexafluoropropene. The pyrolysis of chlorodifluoromethane is an exceedingly complex reaction, however, for the pyrolyzates have been found to contain tetrafluoroethylene, hexafluoropropene, unreacted chlorodifluoromethane, as well as minor amounts of difluoromethane, trifluoromethane, chlorotrifluoromethane, hexafluoroethane, dichlorodifluoromethane octafluorocyclobutane, chlorotrifluoroethylene octafluoroisobutene, hydrogen chloride, to cite but a few of the readily identifiable components of the pyrolyzate. Table I sets forth several of the compounds, in the order of their ascending boiling points, which have been isolated and identified from chlorodifluoromethane pyrolyzates and which distill, at atmospheric pressure, at temperatures below 10° C.

*Table I.*—*Low boiling compounds identified in chlorodifluoromethane pyrolyzates*

| Compound: | Boiling point (° C.) |
|---|---|
| Hydrogen chloride | −85 |
| Trifluoromethane | −82.4 |
| Chlorotrifluoromethane | −81.1 |
| Hexafluoroethane | −78.4 |
| Tetrafluoroethylene | −76.6 |
| Chlorodifluoromethane | −40.8 |
| Hexafluoropropene | −29.4 |
| Octafluorocyclobutane | −5.5 |
| Octafluoroisobutene | +7 |

Since the presence of minute traces of impurities in tetrafluoroethylene or hexafluoropropene tend to decrease the thermal stability of homopolymers and copolymers produced from these fluoroolefins, careful purification of tetrafluoroethylene and hexafluoropropene prepared by the pyrolysis of chlorodifluoromethane or other halofluoroalkanes is required prior to their use in any polymerization process. Although the crude gaseous pyrolyzate of chlorodifluoromethane may be washed with water to remove acid, dried, and then fractionally distilled in a conventional fractionation column to separate it into two fractions, namely a low boiling distillate containing trifluoromethane, chlorotrifluoromethane, hexafluoroethane, and part of the tetrafluoroethylene, and a distillation residue containing all of the remaining components of the pyrolyzate, the close proximity of the boiling points of all of the components in the low boiling distillate precludes their separation by fractional distillation and therefore makes it difficult to obtain high purity tetrafluoroethylene from this distillate, even with precision fractionation equipment. Tetrafluoroethylene may be separated from hexafluoropropene and unreacted chlorodifluoromethane by further fractional distillation of the high boiling distillation residue; however, hexafluoropropene and chlorodifluoromethane form an azeotropic mixture containing 13 mole percent of hexafluoropropene and 87 mole percent of chlorodifluoromethane, with any excess chlorodifluoromethane remaining in the still residue, and consequently high purity hexafluoropropene cannot be readily recovered from the high boiling distillation residue. As a practical matter, therefore, the normal work-up by distillation of chlorodifluoromethane pyrolyzates is inadequate for the purpose of isolating high purity tetrafluoroethylene and hexafluoropropene from the pyrolysis reaction products.

The present invention provides an improved process for the isolation and recovery of substantially pure tetrafluoroethylene and hexafluoropropene from chlorodifluoromethane pyrolyzates. Employing various fractional distillates and distillation residues from chlorodifluoromethane pyrolyzates, we have found that at a given temperature the solubilities in polar organic solvents of several components of these pyrolyzates vary significantly from each other, although there may be little difference in the solubilities of the remaining components. Moreover, we have found that even though these latter components possess similar solubilities in polar organic solvents at a particular temperature, varying the temperature of the solvent disproportionately changes their relative solubilities. For example, at 20° C., the solubility of hexafluoropropene in methanol is 2 percent by weight, while that of chlorodifluoromethane is 17 percent by weight; at the same temperature, however, the solubilities in methanol of trifluoromethane and tetrafluoroethylene are 2 percent and 1.7 percent by weight, respectively. By lowering the temperature of the solvent to from −40° C. to 10° C., the difference in solubilities between trifluoromethane and tetrafluoroethylene increases significantly, thereby facilitating their separation by selective solvent absorption. This phenomenon has been observed with many highly polar organic solvents, thereby permitting these solvents to be employed in the selective solvent absorption of chlorodifluoromethane from a mixture of chlorodifluoromethane and hexafluoropropene, or for the absorption of hexafluoroethane, trifluoromethane, chlorotrifluoromethane and other low boiling components from a distillate containing tetrafluoroethylene and these low boiling compounds. When the techniques of multiple fractional distillation and selective solvent absorption with polar organic solvents are effectively employed in the processing of chlorodifluoromethane pyrolyzates, it is possible to isolate and recover substantially pure tetrafluoroethylene and hexafluoropropene from these pyrolyzates.

Based on these discoveries, the invention provides a processes for the isolation and recovery of substantially pure tetrafluoroethylene and hexafluoropropene from chlorodifluoromethane pyrolyzates which comprises (a) washing a pyrolyzate formed upon the pyrolysis of chlorodifluoromethane and containing tetrafluoroethylene, hexafluoropropene, unreacted chlorodifluoromethane, and other components, with water to remove any water-soluble acids which were concurrently formed during the pyrolysis reaction and which remain in the pyrolyzate; (b) subjecting the water-washed pyrolyzate to fractional distillation to separate the pyrolyzate into (i) a first distillate containing part of the tetrafluoroethylene and substantially all of the low boiling components of the pyrolyzate, and (ii) a first distillation residue; (c) contacting the first distillate with a polar organic solvent at a temperature in the range from about −40° C. to about 10° C. to dissolve by absorption substantially almost all of the low boiling components from the first distillate in the polar organic solvent while leaving undissolved substantially all of the tetrafluoroethylene contained in the first distillate; (d) combining the tetrafluoroethylene remaining undissolved from the solvent absorption of the first distillate with the first distillation residue and then subjecting the resultant mixture to fractional distillation to separate it into (i) a second distillate consisting essentially of substantially pure tetrafluoroethylene, thereby isolating substantially pure tetrafluoroethylene from the pyrolyzate, and (ii) a second distillation residue; and recovering the resultant substantially pure tetrafluoroethylene from this fractional distillation; (e) subjecting the second distillation residue to fractional distillation to separate it into (i) a third distillate consisting essentially of hexafluoropropene and chlorodifluoromethane, and (ii) a third distillation residue; (f) contacting the third distillate with a polar organic solvent to dissolve by absorption substantially all of the chlorodifluoromethane from the third distillate in the polar organic solvent while leaving undissolved substantially pure hexafluoropropene, thereby isolating substantially pure hexafluoropropene from the pyrolyzate; and recovering the resultant subsantially pure hexafluoropropene from this selective solvent absorption; and (g) recovering the chlorodifluoromethane remaining in the polar organic solvent employed in the solvent absorption of the third distillate. As used herein, the phrase "low boiling components of the pyrolyzate" refers to those fluorocarbon compounds such as trifluoromethane, chlorotrifluoromethane, and hexafluoroethane, which are formed upon the pyrolysis of chlorodifluoromethane and which possess a boiling point, at atmospheric pressure, lower than that of tetrafluoroethylene (−76.6° C.).

The solvolytic selectivity exhibited by polar organic solvents for certain but not all components of the chlorodifluoromethane pyrolyzates may be illustrated by a comparison of the relative solubilities of hexafluoropropene and chlorodifluoromethane in various highly polarized and non-polar solvents. Table II sets forth the solubilities, at 25° C., of hexafluoropropene and chlorodifluoromethane in various organic polar and non-polar solvents.

Table II.—solubilities of hexafluoropropene and chlorodifluoromethane

| Solvent | Solubility of Hexafluoropropene (Percent) | Solubility of Chlorodifluoromethane (Percent) |
| --- | --- | --- |
| Dimethylformamide | 2.0 | 29.0 |
| Acetone | 3.8 | 20.0 |
| Methanol | 2.0 | 17.0 |
| Ethanol | 2.6 | 12.0 |
| Isopropanol | 2.6 | 10.0 |
| Benzene | 1.3 | 6.0 |
| Dodecane | 1.3 | 4.0 |
| Carbon tetrachloride | 1.0 | 1.5 |

As shown in Table II, the solubility of hexafluoropropene in various organic solvents is below 4 percent by weight, while the solubility of chlorodifluoromethane in highly polar organic solvents, such as dimethylformamide, acetone, and alkanols with short carbon chains (e.g., lower alkanols), is from five to twenty times that of hexafluoropropene. Consequently, the chlorodifluoromethane contained in an azeotropic mixture of hexafluoropropene and chlorodifluoromethane may be selectively dissolved in a highly polar organic solvent without substantially dissolving the hexafluoropropene.

The disproportionate effect of temperature on the solubilities of various components of chlorodifluoromethane pyrolyzates in methanol and dimethylformamide is illustrated by the data set forth in Table III. As shown in Table III, the difference in the solubilities of chlorodifluoromethane and hexafluoropropene in methanol at 20° C. is sufficiently large to permit the selective solvent absorption of chlorodifluoromethane. At 20° C., the difference in solubility of trifluoromethane and tetrafluoroethylene in methanol is minute, thereby precluding the separation of these compounds by methanolic absorption at this temperature. By lowering the temperature of the solvent to form −40° C. to 10° C., and preferably from −20° C. to 0° C., the solubility of trifluoromethane is greatly increased without any substantial increase in the solubility of tetrafluoroethylene, thereby permitting the selective solvent absorption of the low boiling components from the chlorodifluoromethane pyrolyzates while leaving undissolved the tetrafluoroethylene. When these techniques of selective solvent absorption by polar organic solvents of certain components of the pyrolyzate are combined in a process employing fractional distillation in accordance with the invention, it is possible to isolate and recover tetrafluoroethylene and hexafluoropropene having a purity of 99 percent, or higher. Moreover, the process may be made continuous and automated such that tetrafluoroethylene and hexafluoropropene are isolated and recovered in high purity from the pyrolysis reaction products of chlorodifluoromethane, while the unreacted chlorodifluoromethane may be recovered and recycled back to the pyrolysis reaction.

TABLE III.—Effect of temperature on the solubilities of chlorodifluoromethane, hexafluoropropene, trifloromethane and tetrafluoroethylene in methanol and diformamide

| Temperature (° C.) | Solubility in Methanol (Percent) | | | | Solubility in Dimethylformamide (Percent) | |
| --- | --- | --- | --- | --- | --- | --- |
| | $CHClF_2$ | $C_3F_6$ | $CHF_3$ | $C_2F_4$ | $CHF_3$ | $C_2F_4$ |
| +20 | 17 | 2 | 2 | 1.7 | 5 | 1.3 |
| 0 | 41 | 6 | 5 | 2 | 8.5 | 1.7 |
| −20 | 120 | 13 | 10 | 2.5 | 20 | 1.7 |
| −30 | | | 15 | 2.5 | 28 | 1.7 |

For illustrative purposes, a preferred practical embodiment of the process of the invention is described below with reference to the accompanying drawing, the single figure of which sets forth a schematic flow-sheet for the continuous isolation and recovery of high purity tetrafluoroethylene and hexafluoropropene from chlorodifluoromethane pyrolyzates:

Chlorodifluoromethane (B.P. −41° C.) was continuously pyrolyzed in a reactor 1 at a temperature in the range from about 600° C. to about 1000° C., using a residence time in the reaction zone of the reactor 1 in the range from about 0.005 to about 0.2 second. The gaseous pyrolyzate was scrubbed with water in an acid removal tower 2 to dissolve hydrogen chloride, and the wet gas was dried by passing it through a water-gas separator 3 and then through a drying tower 4 packed with a suitable drying agent. Gas chromatographic analysis of the dry gas existing from the drying tower 4 indicated that for every 100 parts by weight of tetrafluoroethylene, the water-washed pyrolyzate contained from about 70 to about 250 parts by weight of unreacted chlorodifluoromethane, from about 0 to about 2 parts by weight of trifluoromethane, from about 0 to about 0.5 part by weight of chlorotrifluoromethane, from about 0 to about 0.5 part by weight of hexafluoroethane, from about 0 to 2 parts by weight of hexafluoropropene, and a small amount of a high boiling fraction, the variances in concentration of the components in the pyrolyzate being dependent upon tahe particular reaction conditions employed during the pyrolysis.

The dry gaseous pyrolyzate exiting from the drying tower 4 was introduced into a first fractionation column 5 (bubble cap type) and continuously fractionally distilled at a pressure in the range from 14 to 16 kilograms per square centimeter (gauge), with the over-head temperature of the column 5 maintained at about —5° C. to about —8° C.

The overhead distillate, which contained part of the tetrafluoroethylene, as well as the major portion of all of the low boiling components of the pyrolyzate, such as trifluoromethane, chlorotrifluoromethane, hexa fluoroethane, and other compounds, was continuously recovered from the top of the first fractionation column 5 and collected in a storage tank 6, from which this distillate was introduced into the bottom of a first separation column 7 packed with Raschig rings. Methanol from a solvent storage tank 8 was pumped through a heat exchanger 9, which cooled the solvent to a temperature from —20° C. to 0° C., and the cold methanol introduced into the top of the separation column 7, where it was sprayed downwardly to effect countercurrent absorption of the distillate (B.P. —5° C. to —8° C.) flowing upwardly through the separation column 7. At temperatures in the range from —20° C. to 0° C., the methanol selectively dissolved substantially all of the low boiling components from the distillate while leaving substantially undissolved the tetrafluoroethylene contained in the distillate.

Methanol containing all of the low boiling components extracted from the low boiling distillate was continuously recovered from the bottom of the first separation column 7 and introduced into a first solvent regenerator 10, in which the dissolved vapors were stripped from the methanol and discarded. Solvent recovered from the bottom of the stripper 10 was recycled back to the solvent storage tank 8.

Tetrafluoroethylene, which remained undissolved from the methanol absorption of the low boiling distillate, was continuously recovered from the top of the first separation column 7, passed through a stripper 11 to remove any entrained methanol, and then stored in a tetrafluoroethylene hold tank 12. This tetrafluoroethylene was combined with the distillation residue from the bottom of the first fractionation column 5 and the combined feedstock introduced into a second fractionation column 13 (bubble cap type) where it was continuously fractionally distilled at a pressure from 7.5 to 9 kilograms per square centimeter (gauge) with the temperature at the top of the column 13 being maintained at —25° C. to —20° C. to recover tetrafluoroethylene having a purity of more than 99 percent as the overhead distillate.

The distillation residue at the bottom of the second fractionation column 13 was continuously introduced into a third fractionation column 14, where it was continuously fractionally distilled at a pressure of 4 to 5 kilograms per square centimeter (gauge) with the overhead temperature of the column 14 being maintained at from 0° C. to 5° C. The overhead distillate was a two-component mixture of hexafluoropropene and chlorodifluoromethane, while the bottoms were a high boiling residue which was discarded.

The overhead distillate which exited from the third fractionation column 14 was introduced into a fourth fractionation column 15 maintained at a pressure between 4 and 5 kilograms per square centimeter (gauge) and an overhead temperature of from 0° C. to 5° C. to separate this mixture into an azeotrope consisting of 13 mole percent of hexafluoropropene and 87 mole percent chlorodifluoromethane as the overhead distillate and excess chlorodifluoromethane as the residue. The bottoms from the fourth fractionation column 15, consisting essentially of chlorodifluoromethane, were recycled back to the pyrolytic reactor 1 for further reaction.

The azeotropic mixture of hexafluoropropene and chlorodifluoromethane recovered as the overhead distillate from the fourth separation column 15 was collected in a hold tank 16, from which it was pumped into the bottom of a second separation column 17 packed with suitable packing material. Methanol from the solvent storage tank 8 was introduced into the top of the separation column 15 where it was sprayed downwardly to effect countercurrent absorption of the azeotropic mixture of hexafluoropropene and chlorodifluoromethane rising upwardly through the column 17. At ambient temperatures (20° C. to 25° C.), methanol dissolved substantially all of the chlorodifluoromethane contained in the azeotropic mixture while leaving the hexafluoropropene undissolved.

The undissolved hexafluoropropene exiting from the top of the second separation column 17 was passed through a stripper 18 to remove any entrained methanol, and then into a hexafluoropropene storage tank 19 from which it was recovered for use. Gas chromatographic analysis indicated that this hexafluoropropene had a purity of more than 99 percent.

The methanol solution of chlorodifluoromethane exiting from the bottom of the second separation column 17 was pumped into a second solvent regenerator 20 where chlorodifluoromethane was stripped from solution, recovered from the overhead of the solvent regenerator 20, and passed through a stripper 21 to remove any entrained methanol. Although not shown in the accompanying flow-sheet, this chlorodifluoromethane was recycled back to the pyrolysis reactor 1. Methanol was recovered from the bottom of the solvent regenerator 20 and recycled back to the solvent storage tank 8 for reuse.

We claim:

1. A process for the isolation and recovery of substantially pure tetrafluoroethylene and hexafluoropropene from chlorodifluoromethane pyrolyzates which comprises
    (a) washing a pyrolyzate formed upon the pyrolysis of chlorodifluoromethane and containing tetrafluoroethylene, hexafluoropropene, unreacted chlorodifluoromethane, and other components, with water to remove any water-soluble acids which were concurrently formed during the pyrolysis reaction and which remain in the pyrolyzate;
    (b) subjecting the water-washed pyrolyzate to fractional distillation to separate the pyrolyzate into (i) a first distillate containing part of the tetrafluoroethylene and substantially all of the low boiling components of the pyrolyzate, and (ii) a first distillation residue;
    (c) contacting the first distillate with a polar organic solvent of the group consisting of methanol, ethanol, isopropanol, acetone, and dimethylformamide at a temperature in the range from about —40° C. to about 10° C. to dissolve by absorption substantially all of the low boiling components from the first distillate in the polar organic solvent while leaving undissolved substantially all of the tetrafluoroethylene contained in the first distillate;
    (d) combining the tetrafluoroethylene remaining undissolved from the solvent absorption of the first distillate with the first distillation residue and then subjecting the resultant mixture to fractional distillation to separate it into (i) a second distillate consisting essentially of substantially pure tetrafluoroethylene, thereby isolating substantially pure tetrafluoroethylene from the pyrolyzate, and (ii) a second distillation residue; and recovering the resultant substantially pure tetrafluoroethylene;
    (e) subjecting the second distillation residue to fractional distillation to separate it into (i) a third distillate consisting essentially of hexafluoropropene and chlorodifluoromethane, and (ii) a third distillation residue;
    (f) contacting the third distillate with a polar organic solvent of the group consisting of methanol, ethanol, isopropanol, acetone, and dimethylformamide to dissolve by absorption substantially all of the chlorodifluoromethane from the third distillate in the polar organic solvent while leaving undissolved substantially pure hexafluoropropene, thereby isolating substantially pure hexafluoropropene from the pyrolyzate, and recovering the resultant substantially pure hexafluoropropene; and
(g) recovering the chlorodifluoromethane remaining in the polar organic solvent employed in the solvent absorption of the third distillate.

2. A process for the isolation and recovery of substantially pure tetrafluoroethylene and hexafluoropropene from chlorodifluoromethane pyrolyzates which comprises
(a) washing a pyrolyzate formed upon the pyrolysis of chlorodifluoromethane and containing tetrafluoroethylene, hexafluoropropene, unreacted chlorodifluoromethane, and other components, with water to remove any water-soluble acids which were concurrently formed during the pyrolysis reaction and which remain in the pyrolyzate;
(b) subjecting the water-washed pyrolyzate to fractional distillation to separate the pyrolyzate into (i) a first distillate containing part of the tetrafluoroethylene and substantially all of the low boiling components of the pyrolyzate, and (ii) a first distillation residue;
(c) contacting the first distillate with a lower alkanol at a temperature in the range from −20° C. to 0° C. to dissolve by absorption substantially all of the low boiling components from the first distillate in the alkanol while leaving undissolved substantially all of the tetrafluoroethylene contained in the first distillate;
(d) combining the tetrafluoroethylene remaining undissolved from the solvent absorption of the first distillate with the first distillation residue and then subjecting the resultant mixture to fractional distillation to separate it into (i) a second distillate consisting essentially of substantially pure tetrafluoroethylene, thereby isolating substantially pure tetrafluoroethylene from the pyrolyzate, and (ii) a second distillation residue; and recovering the resultant substantially pure tetrafluoroethylene;
(e) subjecting the second distillation residue to fractional distillation to separate it into (i) a third distillate consisting essentially of hexafluoropropene and chlorodifluoromethane and (ii) a third distillation residue;
(f) contacting the third distillate with a lower alkanol to dissolve by absorption substantially all of the chlorodifluoromethane from the third distillate while leaving undissolved substantially pure hexafluoropropene, thereby isolating substantially pure hexafluoropropene from the pyrolyzate; and recovering the resultant substantially pure hexafluoropropene; and
(g) recovering the chlorodifluoromethane remaining in the alkanol employed in the solvent absorption of the third distillate.

3. A process for the isolation and recovery of substantially pure tetrafluoroethylene and hexafluoropropene from chlorodifluoromethane pyrolyzates which comprises
(a) washing a pyrolyzate formed upon the pyrolysis of chlorodifluoromethane and containing tetrafluoroethylene, hexafluoropropene, unreacted chlorodifluoromethane, and other components, with water to remove any water-soluble acids which were concurrently formed during the pyrolysis reaction and which remain in the pyrolyzate;
(b) subjecting the water-washed pyrolyzate to fractional distillation at a pressure in the range from about 14 to about 16 kilograms per square centimeter gauge to separate the pyrolyzate into (i) a first distillate boiling in the range from about −5° C. to about −8° C. and containing part of the tetrafluoroethylene and substantially all of the low boiling components of the pyrolyzate, and (ii) a first distillation residue;
(c) contacting the first distillate with a lower alkanol at a temperature in the range from about −40° C. to about 10° C. to dissolve by absorption substantially all of the low boiling components from the first distillate in the alkanol while leaving undissolved substantially all of the tetrafluoroethylene contained in the first distillate;
(d) combining the tetrafluoroethylene remaining undissolved from the solvent absorption of the first distillate with the first distillation residue and then subjecting the resultant mixture to fractional distillation at a pressure in the range from about 7.5 to about 9 kilograms per square centimeter gauge to separate it into (i) a second distillate boiling in the range from about −25° C. to about −20° C. and consisting essentially of substantially pure tetrafluoroethylene, thereby isolating substantially pure tetrafluoroethylene from the pyrolyzate, and (ii) a second distillation residue; and recovering the resultant substantially pure tetrafluoroethylene;
(e) subjecting the second distillation residue to fractional distillation at a pressure in the range from about 4 to about 5 kilograms per square centimeter gauge to separate it into (i) a third distillate boiling in the range from about 0° C. to about 5° C. and consisting essentially of a mixture containing hexafluoropropene and chlorodifluoromethane, and (ii) a third distillation residue;
(f) contacting the third distillate with a lower alkanol in which the solubility of chlorodifluoromethane, at 25° C., is at least five times greater than that of hexafluoropropene at the same temperature, to dissolve by absorption substantially all of the chlorodifluoromethane from the third distillate in the alkanol while leaving undissolved substantially pure hexafluoropropene, thereby isolating substantially pure hexafluoropropene from the pyrolyzate; and recovering the resultant substantially pure hexofluoropropene; and
(g) recovering the chlorodifluoromethane remaining in the alkanol employed in the solvent absorption of the third distillate.

4. A process for the isolation and recovery of substantially pure tetrafluoroethylene and hexafluoropropene from chlorodifluoromethane pyrolyzates which comprises
(a) washing a pyrolyzate formed upon the pyrolysis of chlorodifluoromethane and containing tetrafluoroethylene, hexafluoropropene, unreacted chlorodifluoromethane, and other components, with water to remove any water-soluble acids which were concurrently formed during the pyrolysis reaction and which remain in the pyrolyzate;
(b) subjecting the water-washed pyrolyzate to fractional distillation at a pressure in the range from about 14 to about 16 kilograms per square centimeter gauge to separate the pyrolyzate into (i) a first distillate boiling in the range from about −5° C. to about −8° C. and containing part of the tetrafluoroethylene and substantially all of the low boiling components of the pyrolyzate, and (ii) a first distillation residue;
(c) contacting the first distillate with methanol at a temperature in the rang from −20° C. to 0° C. to dissolve by absorption substantially all of the low boiling components from the first distillate in the methanol while leaving undissolved substantially all of the tetrafluoroethylene contained in the first distillate;
(d) combining the tetrafluoroethylene remaining undissolved from the solvent absorption of the first distillate with the first distillation residue and then subjecting the resultant mixture to fractional distillation at a pressure in the range from about 7.5 to about 9 kilograms per square centimeter gauge to separate it into (i) a second distillate boiling in the range from about −25° C. to about −20° C. and consisting essentially of substantially pure tetrafluoroethylene, thereby isolating substantially pure tetrafluoroethylene from the pyrolyzate, and (ii) a second distillation residue; and recovering the resultant substantially pure tetrafluoroethylene;

(e) subjecting the second distillation residue to fractional distillation at a pressure in the range from about 4 to about 5 kilograms per square centimeter gauge to separate it into (i) a third distillate boiling in the range from about 0° C. to about 5° C. and consisting essentially of a mixture containing hexafluoropropene and chlorodifluoromethane, and (ii) a third distillation residue;

(f) contacting the third distillate with methanol to dissolve by absorption substantially all of the chlorodifluoromethane from the third distillate in the methanol while leaving undissolved substantially pure hexafluoropropene, thereby isolating substantially pure hexafluoropropene from the pyrolyzate; and recovering the resultant substantially pure hexafluoropropene; and (g) recovering the chlorodifluoromethane remaining in the methanol employed in the solvent absorption of the third distillate.

5. The method of isolating tetrafluoroethylene from a distillate containing tetrafluoroethylene, hexafluoropropene, chlorodifluoromethane, and other low boiling components which comprises contacting the distillate at a temperature in the range from −40° C. to 10° C. with a lower alkanol to dissolve substantially all of the low boiling components from the distillate in the alkanol while leaving undissolved substantially all of the tetrafluoroethylene, thereby isolating tetrafluoroethylene from the distillate.

6. The method of isolating tetrafluoroethylene from a distillate containing tetrafluoroethylene, hexafluoropropene, chlorodifluoromethane and other low boiling components which comprises contacting the distillate at a temperature in the range from −20° C. to 0° C. with a lower alkanol to dissolve substantially all of the low boiling components from the distillate in the alkanol while leaving undissolved substantially all of the tetrafluoroethylene, thereby isolating tetrafluoroethylene from the distillate.

7. The method of isolating tetrafluoroethylene from a distillate containing tetrafluoroethylene, hexafluoropropene, chlorodifluoromethane and other low boiling components which comprises contacting the distillate with methanol at a temperature in the range from −20° C. to 0° C. to dissolve substantially all of the low boiling components from the distillate in the methanol while leaving undissolved substantially all of the tetrafluoroethylene, thereby isolating tetrafluoroethylene from the distillate.

8. The method of isolating hexafluoropropene from a mixture of hexafluoropropene and chlorodifluoromethane which comprises contacting the mixture with a lower alkanol to dissolve substantially all of the chlorodifluoromethane from the mixture in the alkanol while leaving undissolved substantially all of the hexafluoropropene, thereby isolating hexafluoropropene from the mixture.

9. The method of isolating substantially pure hexofluoropropene from an azeotropic mixture of hexafluoropropene and chlorodifluoromethane which comprises contacting the azeotropic mixture with a lower alkanol in which the solubility of chlorodifluoromethane, at 25° C., is at least five times greater than that of hexafluoropropene at the same temperature, to dissolve substantially all of the chlorodifluoromethane from the azeotropic mixture in the alkanol while leaving undissolved substantially all of the hexafluoropropene, thereby isolating substantially pure hexafluoropropene from the azeotropic mixture.

10. The method of isolating substantially pure hexafluoropropene from an azeotropic mixture of hexafluoropropene and chlorodifluoromethane which comprises contacting the azeotropic mixture with methanol to dissolve substantially all of the chlorodifluoromethane from the azeotropic mixture in the methanol while leaving undissolved substantially all of the hexafluoropropene, thereby isolating substantially pure hexafluoropropene from the azeotropic mixture.

11. The method of isolating substantially pure hexafluoropropene from an azeotropic mixture of hexafluoropropene and chlorodifluoromethane which comprises contacting the azeotropic mixture with dimethylformamide to dissolve substantially all of the chlorodifluoromethane from the azeotropic mixture in the dimethylformamide while leaving undissolved substantially all of the hexafluoropropene, thereby isolating substantially pure hexafluoropropene from the azeotropic mixture.

No references cited.

LEON ZITVER, *Primary Examiner.*

DANIEL D. HORWITZ, *Examiner.*

UNITED STATES PATENT OFFICE
CERTIFICATE OF CORRECTION

Patent No. 3,221,070                      November 30, 1965

Kazuo Okamura et al.

It is hereby certified that error appears in the above numbered patent requiring correction and that the said Letters Patent should read as corrected below.

Column 2, line 58, for "processes" read -- process --; column 4, line 9, for "form" read -- from --; TABLE III, in the heading for "diformamide", in italics, read -- dimethylformamide --, in italics; line 72, for "tahe" read -- the --; column 5, lines 9 and 10, for "hexa fluoroethane" read -- hexafluoroethane --; column 8, line 63, for "rang" read -- range --.

Signed and sealed this 27th day of September 1966.

(SEAL)
Attest:

ERNEST W. SWIDER                                EDWARD J. BRENNER
Attesting Officer                                      Commissioner of Patents